US007997484B2

(12) United States Patent
Godwin et al.

(10) Patent No.: US 7,997,484 B2
(45) Date of Patent: Aug. 16, 2011

(54) RICH CONTENT MANAGEMENT AND DISPLAY FOR USE IN REMOTE FIELD ASSETS

(75) Inventors: Bryan W. Godwin, Round Rock, TX (US); James M. Canter, Austin, TX (US); William Hamilton Harris, Jr., Woodside, CA (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 1272 days.

(21) Appl. No.: 11/612,312

(22) Filed: Dec. 18, 2006

(65) Prior Publication Data

US 2008/0083770 A1 Apr. 10, 2008

Related U.S. Application Data

(60) Provisional application No. 60/825,541, filed on Sep. 13, 2006.

(51) Int. Cl.
*G06F 7/08* (2006.01)

(52) U.S. Cl. ....................................................... 235/381

(58) Field of Classification Search .................. 235/381; 705/14; 700/232
See application file for complete search history.

(56) References Cited

U.S. PATENT DOCUMENTS

| | | | | |
|---|---|---|---|---|
| 3,784,737 | A | 1/1974 | Waehner | 178/6 |
| 4,369,442 | A | 1/1983 | Werth et al. | 340/825.35 |
| 4,412,292 | A | 10/1983 | Sedam et al. | 364/479 |
| 4,454,670 | A | 6/1984 | Bachmann et al. | 40/584 |
| 4,553,211 | A | 11/1985 | Kawasaki et al. | 364/479 |
| 4,611,205 | A | 9/1986 | Eglise | 340/825.35 |
| 4,661,862 | A | 4/1987 | Thompson | 358/335 |
| 4,677,565 | A | 6/1987 | Ogaki et al. | 364/479 |
| 4,766,548 | A | 8/1988 | Cedrone et al. | 364/479 |
| 4,850,009 | A | 7/1989 | Zook et al. | 379/96 |
| 4,926,996 | A | 5/1990 | Eglise et al. | 194/212 |
| 4,954,697 | A | 9/1990 | Kokubun et al. | 235/381 |
| 5,029,098 | A | 7/1991 | Lavasseur | 364/479 |
| 5,077,582 | A | 12/1991 | Kravette et al. | 355/206 |
| 5,090,589 | A | 2/1992 | Brandes et al. | 221/2 |

(Continued)

FOREIGN PATENT DOCUMENTS

DE 41 40 450 A1 6/1993

(Continued)

OTHER PUBLICATIONS

NAMA White Paper: Cashless Vending, The National Automatic Merchandising Association (34 pages), 2004.

(Continued)

*Primary Examiner* — Daniel A Hess

(57) ABSTRACT

A field asset such as a vending machine includes a coin acceptor, a bill validator, and a card reader all operatively connected to a shared bus. A rich content display device displays color graphics and an extended function adapter (EFA) coupled to the shared bus includes a rich content agent (RCA) to manage rich content displayed on the display. The RCA may include a content management agent (CMA) coupled to a rich content player that executes rich content file for display on the display device. The EFA may include a cashless agent to generate procedural state information. The CMA detects the procedural state information and controls the presentation of rich content on the display device based at least in part on the detected procedural state information. The EFA may include an analytic agent to determine a substantive state of the vending machine including an inventory state and an environmental state.

20 Claims, 6 Drawing Sheets

102

U.S. PATENT DOCUMENTS

| | | | | |
|---|---|---|---|---|
| 5,091,713 | A | 2/1992 | Horne et al. | 340/541 |
| 5,117,407 | A | 5/1992 | Vogel | 369/30 |
| 5,184,179 | A | 2/1993 | Tarr et al. | 355/206 |
| 5,207,784 | A | 5/1993 | Schwartzendruber | 221/6 |
| 5,239,480 | A | 8/1993 | Huegel | 364/479 |
| 5,255,819 | A | 10/1993 | Peckels | 222/1 |
| 5,282,127 | A | 1/1994 | Mii | 64/479 |
| 5,323,155 | A | 6/1994 | Iyer et al. | 341/51 |
| 5,337,253 | A | 8/1994 | Berkovsky et al. | 364/479 |
| 5,339,250 | A | 8/1994 | Durbin | 364/479 |
| 5,371,348 | A | 12/1994 | Kumar et al. | 235/472 |
| 5,386,360 | A | 1/1995 | Wilson et al. | 364/146 |
| 5,400,246 | A | 3/1995 | Wilson et al. | 364/146 |
| 5,418,945 | A | 5/1995 | Carter et al. | 395/600 |
| 5,445,295 | A | 8/1995 | Brown | 221/3 |
| 5,505,349 | A | 4/1996 | Peckels | 222/641 |
| 5,507,411 | A | 4/1996 | Peckels | 222/1 |
| 5,561,604 | A | 10/1996 | Buckley et al. | 364/479.05 |
| 5,608,643 | A | 3/1997 | Wichter et al. | 364/479.14 |
| 5,620,079 | A | 4/1997 | Molbak | 194/217 |
| 5,649,308 | A | 7/1997 | Andrews | 370/334 |
| 5,671,362 | A | 9/1997 | Cowe et al. | 395/228 |
| 5,701,252 | A | 12/1997 | Facchin et al. | 364/479 |
| 5,708,223 | A | 1/1998 | Wyss | 73/865.9 |
| 5,769,269 | A | 6/1998 | Peters | 221/7 |
| 5,787,149 | A | 7/1998 | Yousefi et al. | 379/59 |
| 5,794,144 | A | 8/1998 | Comer et al. | 455/426 |
| 5,805,997 | A | 9/1998 | Farris | 455/466 |
| 5,815,652 | A | 9/1998 | Ote et al. | 395/183.07 |
| 5,818,603 | A | 10/1998 | Motoyama | 358/296 |
| 5,822,216 | A | 10/1998 | Satchell, Jr. et al. | 364/479.01 |
| 5,841,866 | A | 11/1998 | Bruwer et al. | 380/23 |
| 5,842,597 | A | 12/1998 | Kraus et al. | 221/150 R |
| 5,844,808 | A | 12/1998 | Konsmo et al. | 364/479.14 |
| 5,850,187 | A | 12/1998 | Carrender et al. | 340/825.54 |
| 5,860,362 | A | 1/1999 | Smith | 101/494 |
| 5,862,517 | A | 1/1999 | Honey et al. | 364/559 |
| 5,867,688 | A | 2/1999 | Simmon et al. | 395/500 |
| 5,892,758 | A | 4/1999 | Argyroudis | 370/335 |
| 5,898,904 | A | 4/1999 | Wang | 455/31.3 |
| 5,905,442 | A | 5/1999 | Mosebrook et al. | 340/3.7 |
| 5,905,882 | A | 5/1999 | Sakagami et al. | 700/86 |
| 5,907,491 | A | 5/1999 | Canada et al. | 364/468.15 |
| 5,909,183 | A | 6/1999 | Borgstahl et al. | 340/825.22 |
| 5,915,207 | A | 6/1999 | Dao et al. | 455/9 |
| 5,918,213 | A | 6/1999 | Bernard et al. | 705/26 |
| 5,924,081 | A | 7/1999 | Ostendorf et al. | 705/30 |
| 5,930,770 | A | 7/1999 | Edgar | 705/28 |
| 5,930,771 | A | 7/1999 | Stapp | 705/28 |
| 5,941,363 | A | 8/1999 | Partyka et al. | 194/217 |
| 5,943,042 | A | 8/1999 | Siio | 345/172 |
| 5,949,779 | A | 9/1999 | Mostafa et al. | 370/389 |
| 5,950,630 | A | 9/1999 | Portwood et al. | 128/897 |
| 5,956,487 | A | 9/1999 | Venkatraman et al. | 709/218 |
| 5,957,262 | A | 9/1999 | Molbak et al. | 194/200 |
| 5,959,536 | A | 9/1999 | Chambers et al. | 710/104 |
| 5,959,869 | A * | 9/1999 | Miller et al. | 700/231 |
| 5,979,757 | A | 11/1999 | Tracy et al. | 235/383 |
| 5,982,325 | A | 11/1999 | Thornton et al. | 342/357.07 |
| 5,982,652 | A | 11/1999 | Simonelli et al. | 363/142 |
| 5,986,219 | A | 11/1999 | Carroll et al. | 177/1 |
| 5,991,749 | A | 11/1999 | Morrill, Jr. | 705/44 |
| 5,997,170 | A | 12/1999 | Brodbeck | 364/479.06 |
| 6,003,070 | A | 12/1999 | Frantz | 709/206 |
| 6,005,850 | A | 12/1999 | Moura et al. | 370/282 |
| 6,012,041 | A | 1/2000 | Brewer et al. | 705/28 |
| 6,021,324 | A | 2/2000 | Sizer, II et al. | 455/403 |
| 6,021,437 | A | 2/2000 | Chen et al. | 709/224 |
| 6,029,143 | A | 2/2000 | Mosher et al. | 705/28 |
| 6,032,202 | A | 2/2000 | Lea et al. | 710/8 |
| 6,038,491 | A | 3/2000 | McGarry et al. | 700/231 |
| 6,052,667 | A | 4/2000 | Walker et al. | 705/15 |
| 6,052,750 | A | 4/2000 | Lea | 710/72 |
| 6,056,194 | A | 5/2000 | Kolls | 235/381 |
| 6,057,758 | A | 5/2000 | Dempsey et al. | 340/539 |
| 6,061,668 | A | 5/2000 | Sharrow | 705/400 |
| 6,068,305 | A | 5/2000 | Myers et al. | 292/201 |
| 6,070,070 | A | 5/2000 | Ladue | 455/419 |
| 6,072,521 | A | 6/2000 | Harrison et al. | 348/12 |
| 6,084,528 | A | 7/2000 | Beach et al. | 340/825.35 |
| 6,085,888 | A | 7/2000 | Tedesco et al. | 194/217 |
| 6,109,524 | A | 8/2000 | Kanoh et al. | 235/381 |
| 6,119,053 | A | 9/2000 | Taylor et al. | 700/231 |
| 6,119,100 | A | 9/2000 | Walker et al. | 705/20 |
| 6,124,800 | A | 9/2000 | Beard et al. | 340/825.35 |
| 6,131,399 | A | 10/2000 | Hall | 62/127 |
| 6,161,059 | A | 12/2000 | Tedesco et al. | 700/232 |
| 6,163,811 | A | 12/2000 | Porter | 709/247 |
| 6,181,981 | B1 | 1/2001 | Varga et al. | 700/236 |
| 6,185,545 | B1 | 2/2001 | Resnick et al. | 705/40 |
| 6,199,753 | B1 | 3/2001 | Tracy et al. | 235/375 |
| 6,230,150 | B1 | 5/2001 | Walker et al. | 705/400 |
| 6,272,395 | B1 | 8/2001 | Brodbeck | 700/236 |
| 6,289,453 | B1 | 9/2001 | Walker et al. | 713/175 |
| 6,304,895 | B1 | 10/2001 | Schneider et al. | 709/203 |
| 6,317,649 | B1 | 11/2001 | Tedesco et al. | 700/232 |
| 6,324,520 | B1 | 11/2001 | Walker et al. | 705/16 |
| 6,338,149 | B1 | 1/2002 | Ciccone, Jr. et al. | 714/38 |
| 6,339,731 | B1 | 1/2002 | Morris et al. | 700/236 |
| 6,341,271 | B1 | 1/2002 | Salvo et al. | 705/28 |
| 6,356,794 | B1 | 3/2002 | Perin, Jr. et al. | 700/78 |
| 6,385,772 | B1 | 5/2002 | Courtney | 725/105 |
| 6,427,912 | B1 | 8/2002 | Levasseur | 235/381 |
| 6,434,534 | B1 | 8/2002 | Walker et al. | 705/14 |
| 6,437,692 | B1 | 8/2002 | Petite et al. | 340/540 |
| 6,442,532 | B1 | 8/2002 | Kawan | 705/35 |
| 6,457,038 | B1 | 9/2002 | Defosse | 709/200 |
| 6,462,644 | B1 | 10/2002 | Howell et al. | 340/5.92 |
| 6,467,685 | B1 | 10/2002 | Teicher | 235/379 |
| 6,502,131 | B1 | 12/2002 | Vaid et al. | 709/224 |
| 6,505,095 | B1 | 1/2003 | Kolls | 700/244 |
| 6,525,644 | B1 | 2/2003 | Stillwagon | 340/5.61 |
| 6,550,672 | B1 | 4/2003 | Tracy et al. | 235/383 |
| 6,553,336 | B1 | 4/2003 | Johnson et al. | 702/188 |
| 6,581,986 | B2 | 6/2003 | Roatis et al. | 292/199 |
| 6,584,309 | B1 | 6/2003 | Whigham | 455/414 |
| 6,585,622 | B1 | 7/2003 | Shum et al. | 482/8 |
| 6,604,086 | B1 | 8/2003 | Kolls | 705/14 |
| 6,604,087 | B1 | 8/2003 | Kolls | 705/14 |
| 6,606,602 | B1 | 8/2003 | Kolls | 705/14 |
| 6,609,113 | B1 | 8/2003 | O'Leary et al. | 705/39 |
| 6,615,623 | B1 | 9/2003 | Ormerod | 70/224 |
| 6,695,166 | B2 | 2/2004 | Long | 221/14 |
| 6,704,714 | B1 | 3/2004 | O'Leary et al. | 705/39 |
| 6,712,266 | B2 | 3/2004 | Bartley et al. | 235/380 |
| 6,714,977 | B1 | 3/2004 | Fowler et al. | 709/224 |
| 6,735,630 | B1 | 5/2004 | Gelvin et al. | 709/224 |
| 6,738,811 | B1 | 5/2004 | Liang | 709/224 |
| 6,748,296 | B2 | 6/2004 | Banerjee et al. | 700/241 |
| 6,751,562 | B1 | 6/2004 | Blackett et al. | 702/61 |
| 6,754,558 | B2 | 6/2004 | Preston et al. | 700/236 |
| 6,772,048 | B1 | 8/2004 | Leibu et al. | 700/241 |
| 6,826,607 | B1 | 11/2004 | Gelvin et al. | 709/224 |
| 6,832,251 | B1 | 12/2004 | Gelvin et al. | 709/224 |
| 6,837,436 | B2 | 1/2005 | Swartz et al. | 235/472.02 |
| 6,844,813 | B2 | 1/2005 | Hardman | 340/539.1 |
| 6,850,252 | B1 | 2/2005 | Hoffberg | 345/716 |
| 6,859,831 | B1 | 2/2005 | Gelvin et al. | 709/224 |
| 6,867,685 | B1 | 3/2005 | Stillwagon | 340/5.64 |
| 6,876,988 | B2 | 4/2005 | Helsper et al. | 706/21 |
| 6,900,720 | B2 | 5/2005 | Denison et al. | 340/5.9 |
| 6,925,335 | B2 | 8/2005 | May et al. | 700/9 |
| 6,959,265 | B1 | 10/2005 | Candela et al. | 702/186 |
| 6,973,475 | B2 | 12/2005 | Kenyon et al. | 709/203 |
| 7,017,085 | B2 | 3/2006 | Braun | 714/47 |
| 7,076,329 | B1 | 7/2006 | Kolls | 700/232 |
| 7,131,575 | B1 | 11/2006 | Kolls | 235/379 |
| 7,191,034 | B2 | 3/2007 | Whitten et al. | 700/244 |
| 7,286,901 | B2 | 10/2007 | Whitten et al. | 700/244 |
| 2001/0002210 | A1 | 5/2001 | Petite | 379/155 |
| 2001/0034566 | A1 | 10/2001 | Offer | 700/236 |
| 2001/0042121 | A1 | 11/2001 | Defosse et al. | 709/224 |
| 2001/0047410 | A1 | 11/2001 | Defosse | 709/224 |
| 2001/0054083 | A1 | 12/2001 | Defosse | 709/217 |
| 2002/0016829 | A1 | 2/2002 | Defosse | 709/217 |
| 2002/0024420 | A1 | 2/2002 | Ayala et al. | 340/5.61 |
| 2002/0032470 | A1 | 3/2002 | Linberg | 607/60 |

| | | | | |
|---|---|---|---|---|
| 2002/0077724 | A1 | 6/2002 | Paulucci et al. | 700/231 |
| 2002/0082665 | A1 | 6/2002 | Haller et al. | 607/60 |
| 2002/0107610 | A1 | 8/2002 | Kaehler et al. | 700/232 |
| 2002/0169539 | A1 | 11/2002 | Menard et al. | 701/200 |
| 2002/0194387 | A1 | 12/2002 | Defosse | 709/251 |
| 2003/0003865 | A1 | 1/2003 | Defosse et al. | 455/41 |
| 2003/0013482 | A1 | 1/2003 | Brankovic | 455/553 |
| 2003/0050841 | A1 | 3/2003 | Preston et al. | 705/16 |
| 2003/0061094 | A1 | 3/2003 | Banerjee et al. | 705/14 |
| 2003/0074106 | A1 | 4/2003 | Butler | 700/236 |
| 2003/0097474 | A1 | 5/2003 | Defosse et al. | 709/246 |
| 2003/0101257 | A1 | 5/2003 | Godwin | 709/223 |
| 2003/0101262 | A1 | 5/2003 | Godwin | 709/224 |
| 2003/0128101 | A1 | 7/2003 | Long | 340/5.26 |
| 2003/0204391 | A1 | 10/2003 | May et al. | 704/8 |
| 2004/0207509 | A1 | 10/2004 | Mlynarczyk et al. | 340/5.23 |
| 2005/0131577 | A1 | 6/2005 | Ota et al. | 700/242 |
| 2005/0155060 | A1* | 7/2005 | Sato et al. | 725/42 |
| 2005/0161953 | A1 | 7/2005 | Roatis et al. | 292/199 |
| 2005/0179544 | A1 | 8/2005 | Sutton et al. | 340/543 |
| 2005/0205666 | A1* | 9/2005 | Ward et al. | 235/381 |
| 2007/0096867 | A1 | 5/2007 | Denison et al. | 340/5.23 |

FOREIGN PATENT DOCUMENTS

| | | | |
|---|---|---|---|
| EP | 0 564 736 | A1 | 10/1993 |
| EP | 0 602 787 | A2 | 10/1993 |
| EP | 0 817 138 | A1 | 1/1998 |
| EP | 0 999 529 | | 5/2000 |
| EP | 1096408 | | 5/2001 |
| FR | 2 744 545 | | 2/1996 |
| FR | 2 755776 | | 5/1998 |
| JP | 04253294 | | 9/1992 |
| JP | 6296335 | A2 | 10/1994 |
| JP | 9198172 | A2 | 7/1997 |
| JP | 10105802 | | 4/1998 |
| WO | WO 89/07807 | | 8/1989 |
| WO | WO 95/04333 | | 2/1995 |
| WO | WO 95/05609 | | 2/1995 |
| WO | WO 97/09667 | | 3/1997 |
| WO | WO 98/45779 | | 10/1998 |
| WO | WO 99/23620 | | 5/1999 |
| WO | WO 99/27465 | | 6/1999 |
| WO | WO 99/36751 | | 7/1999 |
| WO | WO 99/48065 | | 9/1999 |
| WO | WO 00/04475 | | 1/2000 |
| WO | WO 00/04476 | | 1/2000 |
| WO | WO 00/31701 | | 6/2000 |
| WO | WO 02/19281 | | 3/2002 |

OTHER PUBLICATIONS

Cashless—Definition from the Merriam-Webster Online Dictionary; 2 pages, Printed Sep. 9, 2008.

Skywire Provides Details of Wireless 'VendView' System; Vending Times. Sep. 1994.

Wireless Communications Forum; vol. III, No. 1 pp. 25-30, Apr. 1995.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Meet the Smart Coke Machine; The Sacramento Bee Business Technology; Wednesday, Aug. 30, 1995.

Skywire allows vendor tracking of pop stock and sales details; RCR, vol. 14, No. 17, Sep. 4, 1995.

International Search Report for PCT/US99/05983 7 pages. Aug. 13, 1999.

American Power Conversion Internet Article, "Lightning Advisor", at internet ,<http://lightning.apcc.com>, May 10, 2000.

American Products Internet Article, "Product Information", at internet, <http://www.apc.com>, May 10, 2000.

Netbotz Internet Article, "Welcome to Netbotz" at internet <http:www.netbotz.com>, May 10, 2000.

*BT redcare Telemetry Vending Interface Unit* (*VIU*), Antronics Ltd Case Study, <http:www.antronic.co.uk/portfolio/viu>, 4 pgs, 2001.

International Search Report PCT/US01/16749, Dec. 20, 2001.

International Search Report PCT/US01/15522, May 16, 2002.

International Search Report PCT US 01/41640, Aug. 21, 2002.

International Search Report PCT/US 01/31381, Nov. 7, 2002.

International Preliminary Examination Report PCT/US01/31381 (3 pages), May 12, 2003.

International Search Report PCT/US 03/37776, May 17, 2004.

What is an iButton?, Maxim/Dallas, http://www.maxim-ic.com/products/ibutton/ibuttons/, 3 pages, Dec. 29, 2005.

* cited by examiner

EXEMPLARY STAGES OF PROCEDURAL MACHINE STATE FOR A VENDING MACHINE FIELD ASSET

600

RICH CONTENT MANAGEMENT AND DISPLAY FOR USE IN REMOTE FIELD ASSETS

RELATED APPLICATION

This application is related to and claims the benefit of Provisional Application No. 60/825,541, filed Sep. 13, 2006, which is incorporated by reference herein.

TECHNICAL FIELD

The present disclosure is related to the field of machine to machine technology and, more particularly, field assets employed in machine to machine environments and, still more particularly, the manner in which field assets present information to consumers and other users.

BACKGROUND OF THE DISCLOSURE

Machine to machine (M2M) technology refers generally to the ability of machines, devices, and assets, particularly those that are distributed or remote, to exchange information with people and/or with a corporate management system. Although a precise definition of M2M is difficult to formulate, M2M generally encompasses the use of telemetry via networks including, but not limited to, public wireless networks.

Historically, telemetry systems were limited to applications for conglomerates and other well financed organizations. Large oil and gas companies and electric utilities, through the use of extensive customer built dedicated data networks, were among the first private organizations to use telemetry widely. More recently, however, the cost of access to public wireless data networks has been dropping while the capabilities of these networks has been increasing thus making M2M concepts feasible for a much larger audience.

The M2M systems described herein generally include remotely located machines or devices referred to as field assets. Although field assets may encompass any variety of specific types of machines (oil rigs, cellular phone system base stations, ATM machines, and weather monitors), the specific embodiments described herein are in the field of vending machines. Vending machines are unmanned, electromechanical devices that dispense products including consumable products such as soft drinks and snack foods in exchange for cash (e.g., coins or bills) or cashless (credit card, debit card, smart card, RFID payment). Vending machines are generally deployed as remotely located field assets by a company that manages a plurality of such devices.

Field assets such as vending machines are generally operated by a consumer or other human agent interacting with a particular field asset. Vending machines for example, dispense a product such as a soft drink or other consumable product when a consumer interacts with the vending machines by presenting a form of payment and making a product selection. Historically, however, the extent of interaction between consumers and vending machines has been extremely limited and strictly functional. As an example, the type, amount, and format of information that vending machines have traditionally provided to consumers is limited to information such as "Exact Change Only," "Make Selection," or "Make A Different Selection." Some relatively recent vending machine models may include a rudimentary display device capable, for example, of displaying these textual message to a consumer via an LCD display.

The limited amount and type of information that traditional vending machines are able to convey to consumers is notable in contrast to the amount and sophistication of the marketing that is characteristic of many products sold in vending machines. Consumers are presented with all manner of marketing and promotional material from the distributors of soft drinks, snack foods, and other products consumers may associate with vending machines. Television commercials, TV and movie tie-ins, billboards, banner ads on the Internet, magazine ads, and the like are all familiar to consumers. These advertisements and other promotional material are usually highly rich in graphic content. It would be desirable to extend the ability to present consumers with multimedia and other rich content promotional matter to the point of purchase.

SUMMARY OF THE DISCLOSURE

In accordance with teachings of aspect of the present disclosure, a field asset includes a graphical display device suitable for displaying rich content multimedia and a content management agent (CMA) enabled to manage the presentation of rich content messages to a consumer. The CMA may receive signals or information from other agents of the field asset. The CMA may, for example, receive information indicative of the stage in a transaction process in which a consumer is currently engaged as well as information indicative of a state of the field asset. The field asset state, for example, may indicate the stock of products that is currently in the field asset, the pricing for the products, and environmental factors, such as the time and date information, geographical location, weather information, and other information that might have an influence on a consumer's purchasing decisions.

The CMA may operate by responding to the received signals by instructing a rich content player application to display or play a rich content file and display the contents of the file on the graphical display device. The CMA may by guided in its instruction of the rich content player application by referring to a structural file, such as an XML file, that is indicative of the content that is to be displayed during specified transaction stages and field asset states.

Rich content is stored on or downloaded to the field asset and is available for execution under appropriate direction from the CMA. The CMA itself enables targeted interaction with the consumer and with the general public during periods when the field asset is not engaged in a purchasing transaction. The targeted interaction with the consumer may be in various forms such as graphical advertising including advertising for products provided by the field asset as well as third party advertisements under appropriate circumstances, electronic coupons and other discount promotions, incentive programs to influence purchasing decisions based on, for example, time/date/location. The CMA also enables the implementation of rich content and interactive loyalty programs, sweepstakes, contents, and other rewards. The field asset and the CMA may also facilitate consumer surveys or other forms of consumer feedback.

Technical benefits of the present disclosure include the ability to provide targeting and graphical rich content to a consumer at the point of sale in a vending machine environment. The use of XML to define the precise implementation enables developers to concentrate on providing the rich content and determining when and to whom to present the available content. The CMA controls the presentation of media through a file having a defined format and structure by with sufficient flexibility to support the specific interactive and/or rich content vending experience. Moreover, by leveraging existing rich media content players (e.g., Flash® Player from Adobe, Quicktime® player from Apple, etc.), the field asset provider is able to concentrate on providing a CMA that supports the broadest range of functionality and using a content format that is widely recognized and for which a pervasive development community and body of knowledge exists.

Another aspect of the present disclosure is implemented as a computer program product, which is computer readable instructions (software) stored on a computer readable medium, for managing the presentation of rich content messages to a consumer in a vending machine or other remotely located field asset environment. In this implementation, the computer program product includes instructions to detect a stage of a transaction, instructions to detect a state of the vending machine or other field asset, and instructions for initiating execution of rich content by a rich content view or player in response to the transaction stage and machine state. The transaction stage may represent the stage of purchase that a consumer who uses a cashless form of payment is in. In this embodiment, the CMA may receive signals indicative of the transaction stage from a cashless agent. The cashless agent and the CMA may reside physically within non volatile storage of an extended functionality adapter (EFA) of the vending machine. The EFA in one embodiment is connected to a multi drop bus (MDB) of the vending machine or other field asset.

A further aspect of the present disclosure encompasses a method of managing a transaction with a consumer by a remotely located field asset. Initially, the field asset is in an idle state, awaiting the initiation of a transaction by a consumer. The CMA may display a series of one or more rich content messages (e.g., multimedia clips) while the machine is in the idle stage. The multimedia clips may be varied depending, for example, on the time of day (e.g., encouraging the use of coffee substitutes in the morning).

Upon initiation of a transaction, the vending machine or other field asset progresses through a series of transaction stages. The vending machine presents one or more rich content messages to the consumer based on the transaction stage, a state of the vending machine, and so forth. The vending machine may continue to present messages up to and after a vending purchasing transaction is completed (i.e., product selected and provided to the consumer). The post vend interaction may include some form of loyalty or incentive based reward or initiating a consumer survey.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Figure 1:
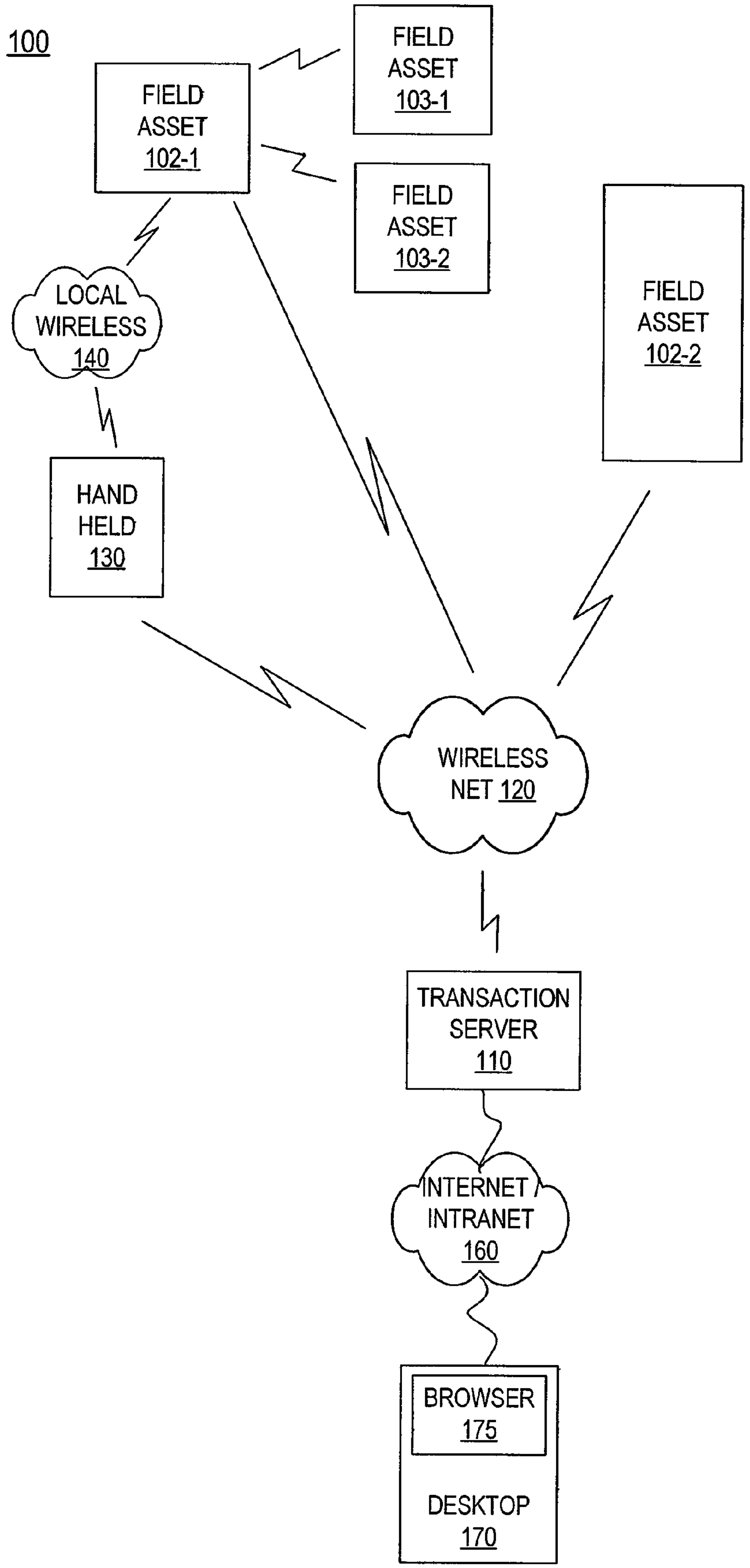
FIG. 1 is a block diagram of selected elements of a machine to machine environment including a plurality of remotely located field assets.

Preferred embodiments and their advantages are best understood by reference to FIG. 1 through FIG. 5, wherein like numerals indicate like and corresponding components. Where different instances of a particular element are shown, they may be numbered with hyphenated reference numerals to indicate a common design or functionality. For example, reference numerals 102-1 and 102-2 represent individual instances of a generic 102 element.

In one aspect, a machine-to-machine (M2M) network for remote field assets is described. M2M network 100 includes a collection of remotely located field assets 102, 103 in communication with a transaction processing server 110. Transaction processing server 110 communicates with a field assets 102 via a wide area wireless network or via local wireless networks using a hand held data processing device as an intermediary. Some field assets, including field assets 103, may lack wireless WAN connectivity and may, therefore, communicate with transaction processing server 110 through an intermediate field asset such as field asset 102-1. In some embodiments, field assets 102-1 may lack built-in resources for local wireless communication. In such embodiments, field asset 102-1 may communicate with hand held device 130 through the use of wireless adapter (not shown in FIG. 1).

Field assets 102 and 103 are exemplified by vending machines in which transactions likely include the sale of consumer goods stocked in the vending machine. In some embodiments, field asset 102 or 103 is an MDB compliant vending machine that includes a vending machine controller (VMC) as the master of an industry standard MDB bus to which one or more peripheral devices are connected. In addition to conventional peripheral devices such as bill validators and coin mechanisms, a field asset may include hardware, firmware, and/or software that implements a platform for providing value added functionality to the vending machine or other field asset. This collection of hardware, software, and/or firmware is referred to herein as an extended function adapter (EFA).

The EFA supports one or more beneficial capabilities that facilitate automated vending machine management. The EFA may, for example, include a audit agent that includes the capacity to perform DEX polling and to store and time stamp the captured DEX data structures.

Referring now to the drawings, FIG. 1 is a block diagram of selected elements of one embodiment of an M2M network 100 including one or more field assets, examples of which are depicted as field assets 102-1 and 102-2 (generically or collectively referred to herein as field asset(s) 102) and field assets 103-1 and 103-2. Field assets 102 are depicted in FIG. 1 as being operable to communicate with a transaction server 110. Field assets 102 may be any set of machines or devices, typically having similar functionality, that are remotely distributed and capable of engaging in some form of transaction. Examples of field assets include oil rigs, cellular phone system base stations, ATM machines, and weather monitors.

Although many different types of field assets exist, embodiments are described herein in the context of a vending machine class of field assets. Vending machines are ubiquitous machines historically used as an unmanned source of perishable and nonperishable consumer products including canned and bottled drink products, snack foods, and so forth. Details of one embodiment of a field asset are described below with respect to FIG. 3.

In the embodiment depicted in FIG. 1, field assets 102 and 103 may communicate with transaction server 110 wirelessly via alternative communication paths. Field asset 102-2 is depicted as connecting "directly" to transaction server 110 via a wireless medium and wireless network 120. Wireless network 120 may employ wireless cellular technology including the well known use of multiple base stations positioned in specified locations to communicate wireless signals across a wide geographic area.

Field asset 102-1 is depicted as being capable of communicating wirelessly with a hand held device 130 via a local wireless network 140 or directly with transaction processing server 110 via wireless net 120. Field asset 102-1 may include integrated wireless functionality, i.e., wireless hardware, firmware, and/or software to for communicating wirelessly with hand held device 130. Alternatively, field asset 102-1 may communicate wirelessly with hand held device 130 through an intervening adapter such as a wireless adapter that plugs into a DEX port of field asset 102-1. Field assets 103 as depicted in FIG. 1 communicate locally with field asset 102-1 and use field asset 102-1 to act as a relay station for information from devices 103-1 and 103-2.

The hand held device 130 is shown as connecting to transaction server 110 using wireless network 120, sometimes referred to herein as global wireless network to distinguish local wireless network 140. Local wireless network 140 may be implemented using any of a variety of short range wireless technologies including as perhaps the most prominent examples, Bluetooth and WiFi (e.g., IEEE 802.11b, IEEE 802.11g, and their derivatives).

In the case of local wireless communication, an operator conveys hand held device 130 to a location that is in close proximity to a field asset 102. The field asset 102 and hand held 130 establish a local wireless signal enabling communication between the two. After establishing a local wireless communication channel, field asset 102 and hand held 130 exchange data or information. Field asset 102 may, as an example, transmit sales transaction information to hand held 130.

Transfer of information from field asset 102-1 to transaction server 110 could be achieved by transferring the data from field asset 102-1 to hand held 130 using local wireless network 140, transporting hand held 130 to a location in proximity to transaction server 110, and transmitting the information in hand held 130 to interaction server 110 via another local wireless (not depicted) transfer. In still another alternative, information may be passed from field asset 102-1 to hand held 130 and/or from hand held 130 to transaction server 110 using a cable or other wired connection, possibly to enhance the security of confidential information.

Transaction server 110 may be implemented as a set of one or more server class computers operable to process many transactions. Transaction server 110 may include, as an example, a database management application (e.g., Oracle, DB2, etc.)

A desktop data processing system 170 is depicted in FIG. 1 as being coupled to transaction server 110 via the Internet or intranet represented by reference numeral 160. Desktop 170 includes a processor, memory, and I/O peripherals according to any of various well known desktop designs. Desktop 170 includes an operating system (OS) and a conventional web browsing application represented by reference numeral 175.

As depicted in FIG. 1, M2M network 100 includes various components that facilitate high volume transaction processing in a remotely distributed architecture that includes wireless communication elements, which may be characterized by relatively unreliable or unstable communication paths to all or some of the remote assets. The elements of M2M network 100 include (1) remote communication facilities to communicate with remote assets over multiple forms of wireless networks, (2) hand held technology suitable for mobile access to the field assets and to a transaction server, (3) server software for processing volumes of transactions, and (4) browser based access to useful information provided by transaction server 110. Although not depicted explicitly in FIG. 1, value added facilities in field assets 102 and 103 include an expandable, PC industry standard communication interface to legacy equipment. The EFA serves this last function and is described in greater detail below. In the preferred embodiment, the EFA provides a platform for interfacing to archaic or otherwise unique protocols such as Data Exchange (DEX) and Multi-Drop Bus (MDB) commonly encountered in remote field asset applications and especially in the vending machine industry.

The type of information conveyed or otherwise exchanged between field assets 102 and interaction server 110 varies depending upon the manner in which and the purpose for which field asset 102 is implemented, but the information most likely includes information about transactions that occur or have occurred using field assets 102. The transaction information referred to can include, as examples, information about when a transaction occurs and other transaction details, for example, what product or combination of products were purchased, what consumer or customer purchased the product (if known), the dollar amount of the purchase, the amount of time required to complete the purchase, the manner of payment, and other information that may be useful to vending machine operators and/or the providers of goods sold through field assets 102.

Figure 2:
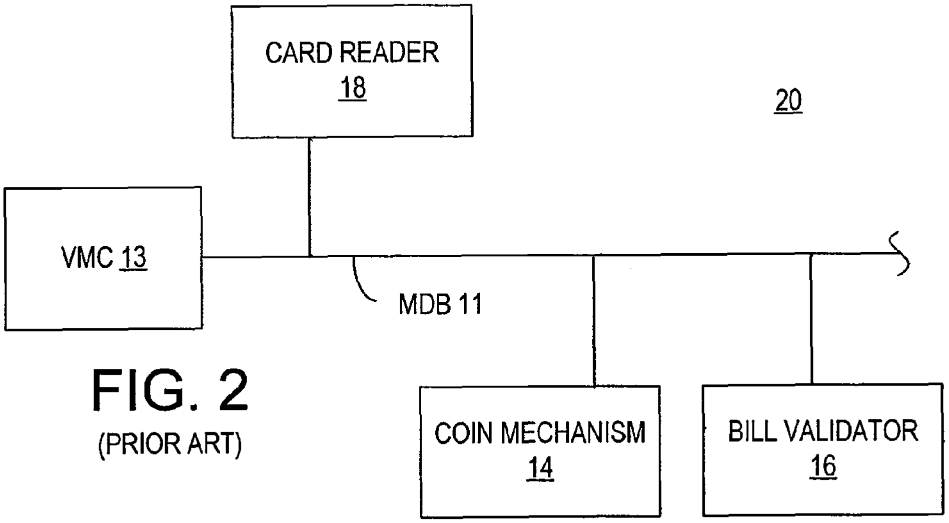
FIG. 2 (PRIOR ART)
FIG. 2 is a block diagram of a vending machine according to the prior art.

Referring now to FIG. 2, selected elements of a conventional MDB-compliant vending machine 20 according to well known prior art is shown. Vending machine 20 includes a vending machine controller 13 and various peripherals devices all connected to a multi drop bus 11. The peripheral devices consist of a coin mechanism 14, a bill validator 16, and a card reader 18. As depicted in FIG. 2, MDB provides a standardized interface for connecting vending machine peripheral devices to a VMC. Although the provision of an interface to which various manufacturers of vending machine peripheral equipment can all comply is highly beneficial, the embodiment of vending machine 20 depicted in FIG. 2 does little in terms of altering the data collection and analysis paradigm of pre-existing DEX machines and does not encompass wireless communication of stored data from the vending machine to a transaction server or other networked resource. Because peripheral devices 14, 16, and 18 are essentially "dumb" devices, all of the available data resides in VMC 13 in the form of traditional DEX data structures.

Figure 3:
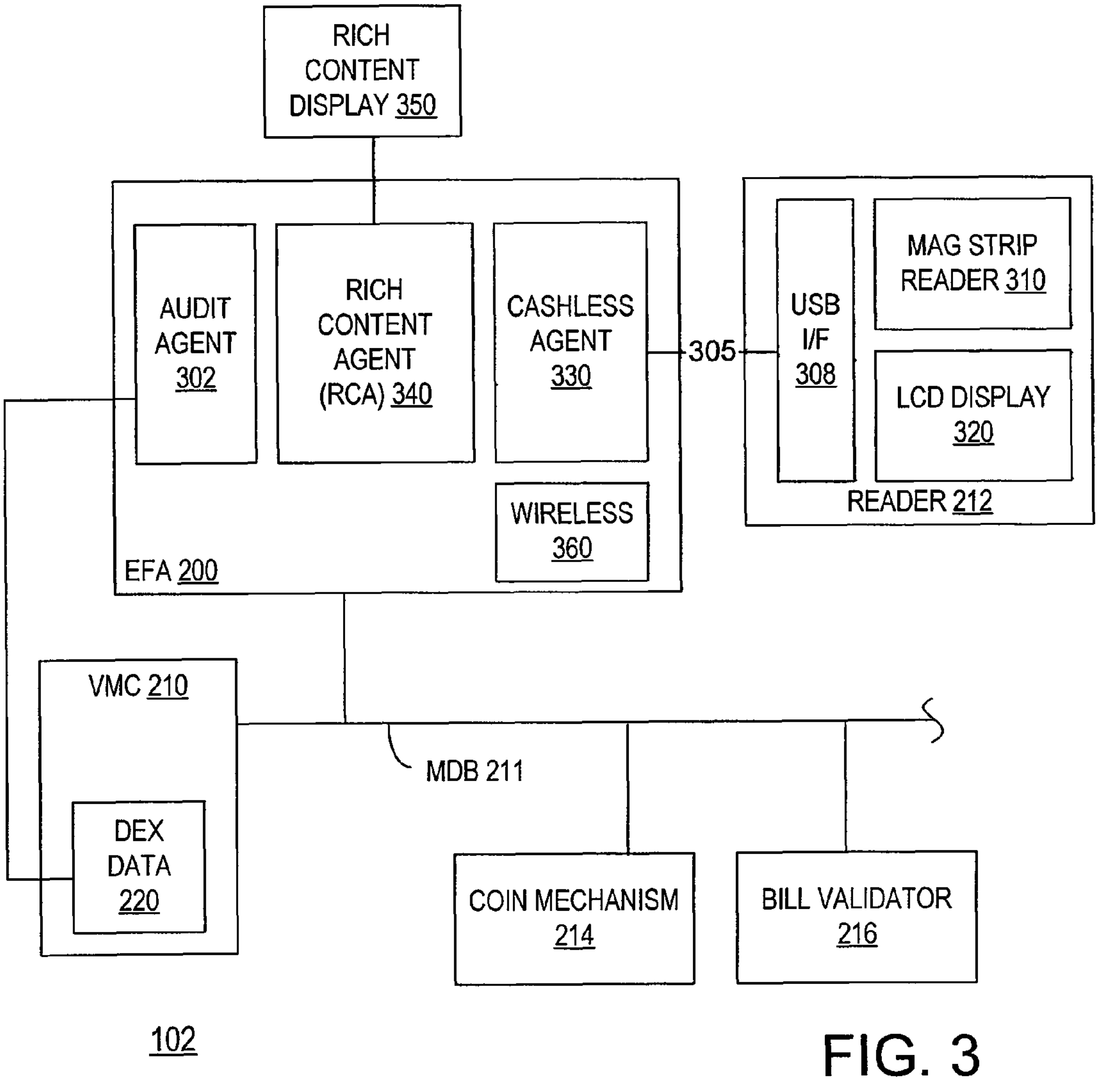
FIG. 3 is a block diagram of selected elements of a field asset of FIG. 1 in communication with a wireless adapter.

Referring now to FIG. 3, an embodiment of a field asset 102 emphasizing rich content management and display capabilities is shown. While the elements of FIG. 3 are equally applicable to field assets having reference numeral 103 in FIG. 1, the remainder of the discussion will use reference numeral 102 exclusively for the sake of simplicity.

In the depicted embodiment, field asset 102 is an MDB compliant machine or device that includes a VMC 210 connected to an MDB 211, to which a plurality of standard peripheral devices are connected. As shown in FIG. 3, field asset 102 includes a coin mechanism 214, a bill validator 216, and a card reader 212. These peripheral devices are well known devices in the field of vending machines generally and MDB compliant vending machines in particular. As implemented in FIG. 3, coin mechanism 214 and bill validator 216 connect directly to MDB 211 while card reader 212 is shown as connecting to MDB 211 using extended function adapter (EFA) 200 as an intermediary. In the depicted embodiment, card reader 212 connects to EFA 200 via a Universal Serial Bus (USB) connection 305. Card reader 212 is shown as including a magnetic strip reader 310, a Liquid Crystal Display (LCD) display 320, and a USB Interface 308, providing access to USB connection 308.

MDB 211 is compliant with the Multi-Drop Bus/Internal Communication Protocol (the MDB protocol) maintained by the National Automatic Marketing Association (NAMA). The MDB protocol is an Interface Standard that allows the various components of a vending machine to communicate to the VMC. The MDB protocol determines the way in which the VMC learns what coins were accepted by the Coin Mechanism, what bills were accepted by the Bill Validator, and how much credit is available through the Card Reader. It is a way for the VMC to "tell" the Coin Mechanism how much change to pay out or to "tell" the card reader how much credit to return to the card.

Unlike many shared bus protocols, the MDB protocol defines the VMC as the one and only master of the MDB and all other peripherals as slaves. The VMC can address packets to any of the peripheral devices, but peripheral devices cannot communicate with each other and only transmit packets to the VMC in response to receiving a packet from the VMC. Also, as suggested previously, MDB is a polling-based protocol. A significant percentage of MDB traffic consists of polling packets issued by the VMC and acknowledge packets from the peripheral devices. In most shared bus architectures, e.g., Ethernet and PCI, devices can act as masters or slaves and polling is not an inherent feature of the architecture.

EFA 200, as its name suggests, includes application extensions that enhance the features of field asset 102. In conjunction with VMC 210, EFA 200 may include, as examples, an Audit Agent 302 suitable for periodically retrieving DEX data 220 from VMC 210 to create a dynamic view of DEX data, a cashless agent 330 suitable for facilitating cashless transactions, and a rich content agent (RCA) 340 for managing and displaying rich content messages to consumers. EFA 200 may also include wireless communication functionality 360 including wireless communication hardware, firmware, and/or software for wireless communication via wireless network 120 (FIG. 1) and/or local wireless network 140.

RCA 340 operates in conjunction with a rich content display 350 connected to EFA 200 to present rich content messages to consumers and potential consumers. Rich content display 350 is preferably any analog or digital display device having QVGA resolution or better and capable of displaying still and moving images including movies and movie clips. Although rich content display 350 is preferably a liquid crystal display (LCD) device desirable for its relatively small dimensional requirements, display 350 may also be a cathode ray tube (CRT) device, a plasma display panel (PDP) device, a surface conduction electron emitter display (SED), and the like.

RCA 340 preferably coordinates the presentation of rich content messages to consumers and potential consumers based on the state of the field asset. The field asset state may include a procedural state indicative of, for example, the current stage in a sequence of transaction stages, an environmental state, indicative of, for example, time and geographical information, and a product state indicative of, for example, the current inventory of products and products prices contained in the field asset. RCA 340 may receive input from one or more other agents on EFA 200. Input from the other EFA agents may partially or completely indicate all or a portion of the state of the field asset.

As indicated above, RCA 340 encompasses content presentation management based, at least under some circumstances, on the state of a vending machine or other field asset. For purpose of the following discussion, a field asset's state is divided roughly into two components referred to herein as its procedural state and its substantive state. The procedural state of a field asset such as a vending machine that engages in consumer transactions may refer to the current stage in a sequence of transaction stages. From this perspective, a field asset may be thought of as a state machine and represented by a conventional state diagram. A simplified state diagram showing selected states of a field asset such as the vending machine depicted in FIG. 3 is presented. In the depicted representation, field asset 102 is shown as being operable to transition from an idle stage 402, in which no transaction has been initiated, to of multiple transaction sequences depending upon the form of payment presented.

If, for example, a consumer inserts coins into a coin mechanism, field asset 102 is depicted as transitioning from idle stage 402 to a coin detected stage 404, which may represent the first in a sequence (not depicted) of transaction stages applicable to coin-based transactions. The coin-based transaction sequence may include, just as examples, a coin detection stage, a coin verification stage, a coin summation stage, a transaction pending stage, a product delivered stage, and a change return stage. Similarly, field asset 102 may include transition to a bill accepted stage 406 representing the first stage in a sequence of stages (not depicted) applicable to bill-based transactions when or one or more dollar bills (or other denominations) are received by a bill acceptor/validator.

Figure 4:
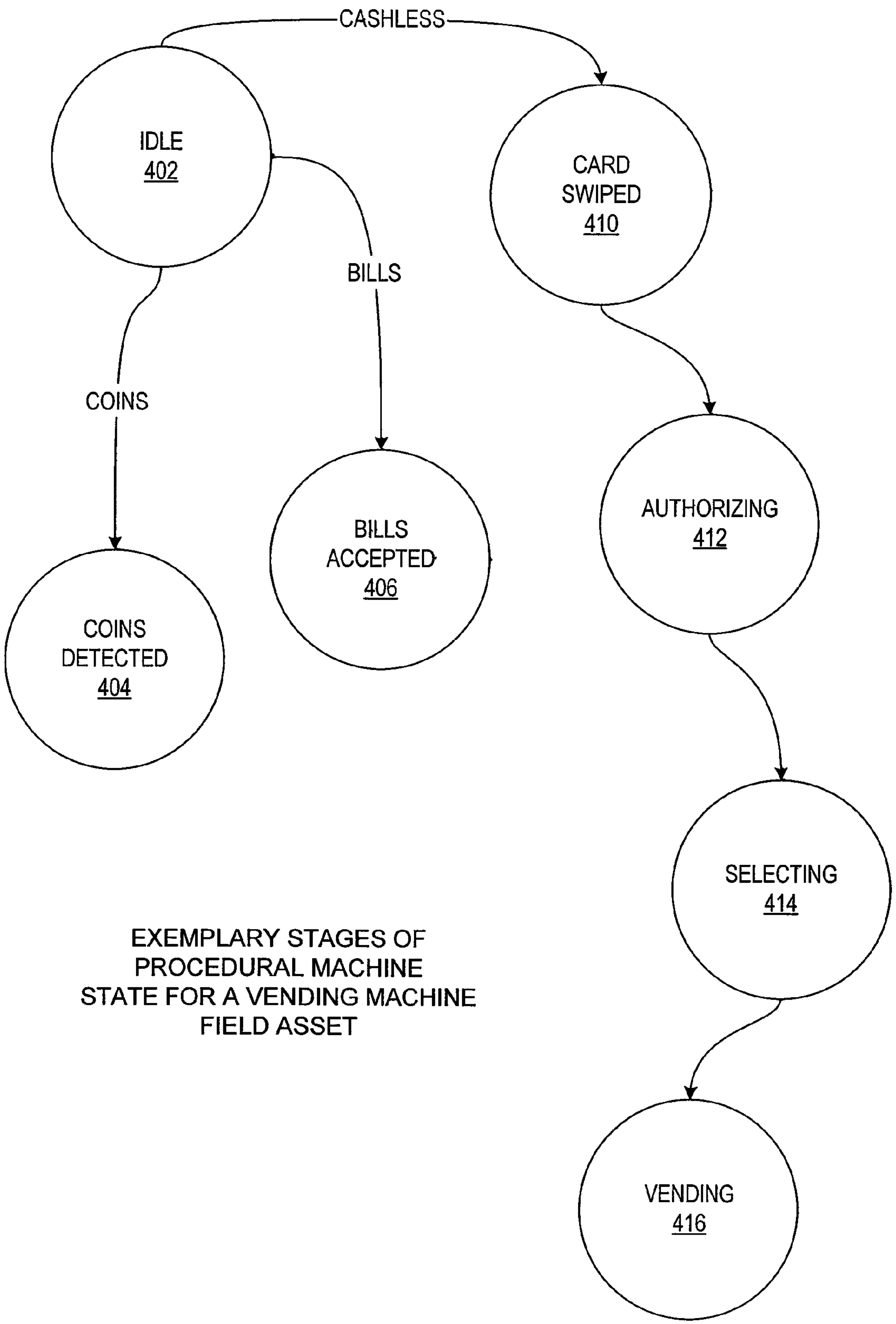
FIG. 4 is a state diagram showing selected states and state transitions characteristic of the field asset depicted in FIG. 3.

As depicted in FIG. 4, field asset 102 may also transition to a sequence of transaction stages applicable to a cashless transaction. As suggested by its name, a cashless transaction represents any transaction initiated without the use of coins or bills. Cashless transactions include credit card, debit card, and smart card transactions as well as other forms of cashless purchasing including, as examples, radio frequency ID cards, cellular phone and PDA initiated transactions, and others that will be familiar to those in the field of vending and cashless transaction processing.

As depicted in FIG. 4, field asset 102 is shown as transitioning from idle stage 402 to a card swiped stage 410 in response to a consumer swiping a credit card, debit card, etc., through a card reader of field asset 102. Card swipe may be the first action detected by the field asset in a cashless transaction and it may be desirable to present rich content to the consumer at that point. As an example, field asset 102 may detect the name of the card holder from information embedded in the card's magnetic stripe or other form of storage and use the detected name in conjunction with a welcome or other form of introductory message. If the field asset has a local database of frequent users or loyal consumers, it may be desirable to provide other forms of recognition to the consumer and possible to present the loyal consumer with a richer set of options, discounts, incentives, etc. Regardless of what type of content is desired for presentation to a consumer, field asset 102 through rich content agent 430 is enabled to permit the field asset owner or manager a great deal of flexibility.

Returning to the simplified transaction state diagram of FIG. 4, additional representative stages of a cashless transaction sequence are illustrated. In the illustrated example, the cashless transaction sequence is shown as including card swiped stage 410, authorizing stage 412, during which time the consumer's form of payment is verified for authenticity and sufficient credit, a selecting stage 414, during which time a purchase has been authorized, but the consumer has not yet selected a product to purchase, and a vending stage 416, which follows selection and delivery of the selected produce. In other implementations, the transaction stage diagram is substantially more complex than that shown in FIG. 4, with stages including transition paths back to previous stages and the addition of many other stages not shown in FIG. 4. Thus, FIG. 4, although it likely does not include detail sufficient to support an actual implementation, illustrates the concept of a field asset having a transaction state characteristic that is indicative of a current stage of the machine in a transaction stage sequence. In one aspect, RCA 340 is enabled to detect a transaction stage and to manage the presentation of rich media content based at least in part on the detected transaction stage.

The substantive state of field asset 102 may encompass parameters or characteristics that are independent of an asset's procedural state. A field asset's physical location, for example, is a characteristic that does not dependent on a transaction stage sequence, but which may nevertheless be desirable to know for purposes of presenting meaningful or targeted rich media messages to a consumer or potential consumer. For example, while it might be desirable to promote field asset products using by conveying an association between the products and a particular athletic team, conveying the correct association is dramatically dependent upon the location of the field asset. Imagine, for example, the efficacy of a University of Texas Longhorn based promotion presented on a field asset in College Station, Tex. or Norman, Okla. or a New York Yankees promotion playing on a vending machine in South Boston. Thus, one aspect of a field asset's location or geography state is the political or regional division in which the field asset is located. Another aspect to the location state of a field asset could have to do with the function of the building in which the field asset is located. Thus, for example, a vending machine owner or manager may sell third party ads for display on the display device of a field asset. The potential purchases of this third party advertising time may dependent on where the field asset is located. A field asset located in or near the show room of a new car dealership for example might beneficially display advertisements or other rich media messages for the types of automobiles sold by the dealership.

In addition to geographical state, a field asset generally and a vending machine in particular has other state attributes including its inventory state, its pricing state, and an environmental state. A field asset's inventory state refers to the quantity and selection of the products remaining in the field asset at any given point in time. Inventory state may be useful in managing rich media content to avoid, for example, displaying a promotion for a product that is currently out of stock.

Pricing state refers to the prices that each item of inventory is currently being offered at. Pricing state may be useful in managing rich media presentation by enabling, as an example, a field asset to determine a discount level to use when initiating a promotion or inventive program. If, for example, it is desired to promote an item as being temporarily sold at a specified discount, the pricing state may facilitate the use of discount percentages that are easily incorporated into the pricing structure of the machine. It would not, for example, make sense to promote a 75 cent can of soda at a 50% discount.

A field asset's environmental state may include the date and time, the external temperature and humidity, the proximity to the nearest other field asset, and essentially any other condition or characteristic that might be detectable by the field asset and potentially useful in managing rich media content presentation. Field assets may wish, for example, to promote a different mix of products at night than during the day time, or to shut down completely during one or the other. Similarly, weather conditions may be monitored and used to control rich content messages so that ice cream bars and popsicles are emphasized during hot weather while chicken soup and hot chocolate are emphasized during a blizzard.

Figure 5:
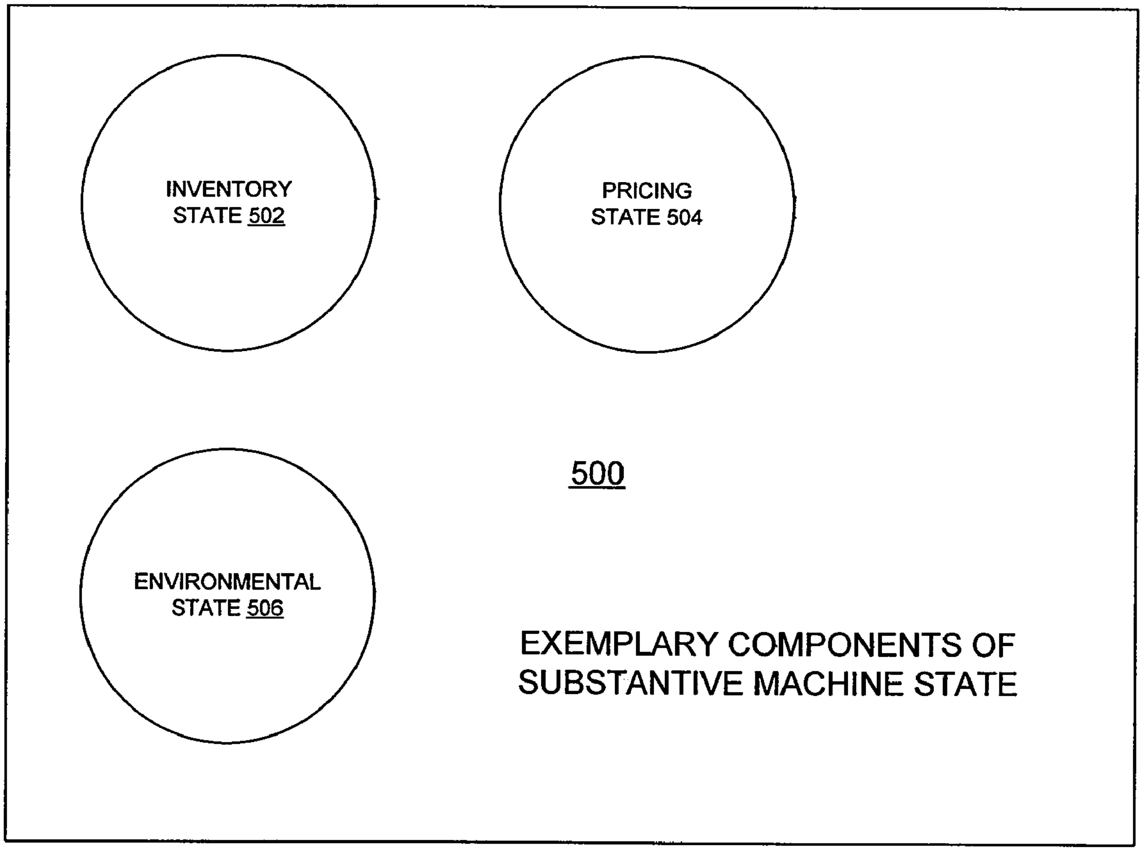
FIG. 5 is a conceptual representation of selected elements of a machine state representing, for example, the product inventory and environmental state.

Turning to FIG. 5, a conceptual depiction of representative information indicative of at least a portion of a field asset's state is illustrated. In the illustrated example, an aspect of machine state referred to as substantive machine state 500 is shown as including an inventory state 502, a pricing state 504, and an environmental state 506. More generally, the substantive state of a field asset may include any characteristic or parameter that is independent of its procedural state and potentially useful as a basis for managing presentation of rich media content.

In the preferred embodiment, rich content agent 410 encompasses the ability to detect a procedural and a substantive state of the field asset and to use the detected state as control inputs for managing the presentation of rich content to consumers and potential consumers. In the preferred embodiment, RCA 340 controls media presentation using a predefined, but extensible set of procedural and substantive characteristics. The developer of RCA 340 may, for example, define an interface or structure for controlling rich media presentation and make the structure or interface publicly available so that third party developers can develop the rich media content itself as well as a set of rules indicating how to manage and display the rich media content with the context of the defined procedural and substantive state of the field asset.

In some embodiments, rich media content management and presentation may be implemented as a set or sequence of computer executable instructions (software) stored on a computer readable medium. The medium may be a nonvolatile medium such as a hard disk, optical disk, or the like. During execution, all or portions of the software may be stored in a volatile storage medium such as a system memory (SRAM), cache memory (DRAM), etc. When executed by a suitable general purpose or application specific microprocessor, the software instructions produce a computer implemented method such as the content management method 600 conceptually represented in the flow diagram of FIG. 6.

Figure 6:
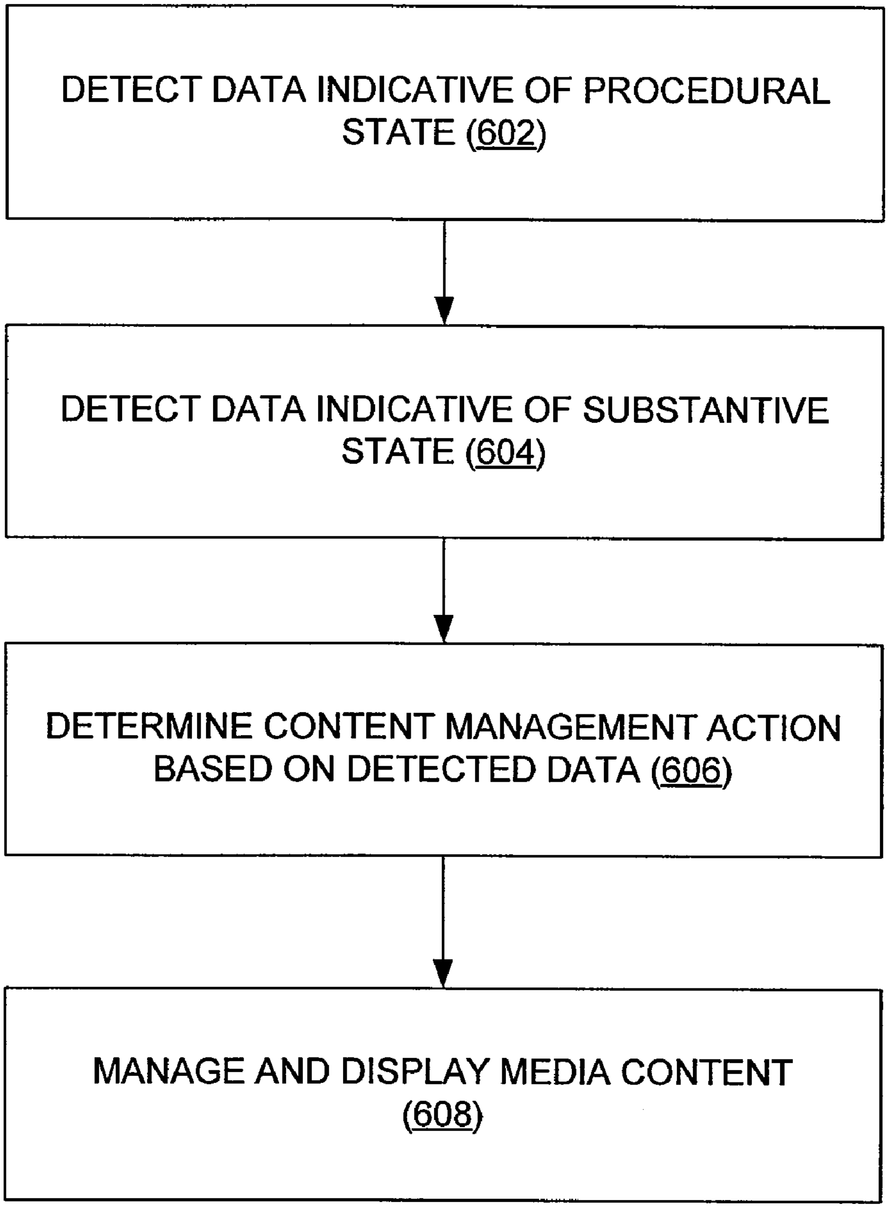
FIG. 6 is a flow diagram of a method of providing targeted and rich content display messages according to one embodiment.

Method 600 as depicted in FIG. 6 includes detecting (block 602) data indicative of a procedural state of a vending machine or other transaction-based field asset. In the context of field asset 102, for example, RCA 340 may receive a procedural state indication from cashless agent 330, another agent executing on EFA 200, or from another peripheral device entirely such as by snooping packet traversing MDB 211. Method 600 further includes detecting (block 604) data indicative of a substantive state of field asset 102. Again, substantive state may be detected from an analytical agent (see FIG. 7 below) on EFA 200.

In block 606, method 600 depicts determining a content management action based at least in part on the procedural state data 602 and the substantive state data 604. In some embodiments, the content management action includes a determination of which, if any, rich media files (i.e., rich media content) are to be presented to the consumer via rich media display device 350. Following the determination of a media content action in block 606, method 600 includes managing by taking the content action determined in block 606 and displaying the rich content on the rich content display 350.

Encompassed within method 600 is the concept of managing the presentation of rich media content via the field asset based on any of a set of characteristics and/or parameters that are detectable by the field asset and useful or potentially useful in controlling the presentation of rich media content to a consumer. For example, encompassed within the concept of detecting procedural state is the information that is known at each stage in a procedural state. Thus, the actions that may be taken at any point in a procedural state may be influenced by or otherwise managed based on any of all information that is available to the field asset at that point.

In the context of cashless transactions, for example, the cashless form of payment generally conveys a greater degree of consumer identity than other forms of payment and this identity information may be suitable for use in employing targeted rich content messaging. If a cashless user's identity is known to a particular field asset, perhaps based upon a transaction cache or other form of database that field asset 102 may retain, rich content presentation may be targeted based in part on the consumer's past purchasing activity.

Consumer identity information enables a wealth of promotional programs that integrate well with the ability to provide rich media content. Loyalty programs can be implemented once a consumer's identity is known. Loyalty program could include traditional "frequent consumer" type of rewards in the form of points that may later be redeemed for discounted or free products. In addition, loyalty programs could be implemented using "perks" in the form of interactive content that is not provided to "unregistered" consumers. For example, a loyal consumer with a demonstrated preference for a particular brand of soft drink may be invited to participate in an election or other survey associated with a television program or other event. Talent search programs that rely on viewer voting, for example, are often sponsored by the producers of consumable products. A loyal purchaser could be invited to participate in a talent search vote at the end of a transaction while the rich content display 350 is utilized to display rich media samples of the various contestants.

Identification of consumer also enables expansion of the ability to implement sweepstakes or contents through vending machine transactions. For example, the ability to identify a consumer enables a program in which winners of a contest or sweepstakes are awarded with a prize that is delivered via the web such as a music or video download. In this manner, for example, a recording artist could release a new song through a channel of field assets simultaneously with or even before a conventional web or record store release.

Even if a consumer is not located in a transaction database that is available to the field asset, the cashless agent or other application running on EFA 200 may be able to detect, or inquire about, demographic data such as the consumers gender and age, that might be used to influence presentation of messaging.

Similarly, substantive state information may be detected and used to implement various promotional efforts. Time and date information, for example, may be used to control the timing of promotional programs, new product introductions, incentive programs, and sweepstakes or contests. Moreover, as indicated previously, the graphical advertising that is presented to a user may be influenced by the substantive state so that "internal" advertisements, which are advertisements for products sold in the vending machine, and external advertisements are timely.

As suggested by the preceding paragraphs, the ability to manage rich media content meaningfully in a field asset environment to present targeted rich media messages to consumers and the ability to present rich media content using rich media hardware installed in the field assets are the cornerstones that enable a wide range of marketing and customer relation opportunities.

Figure 7:
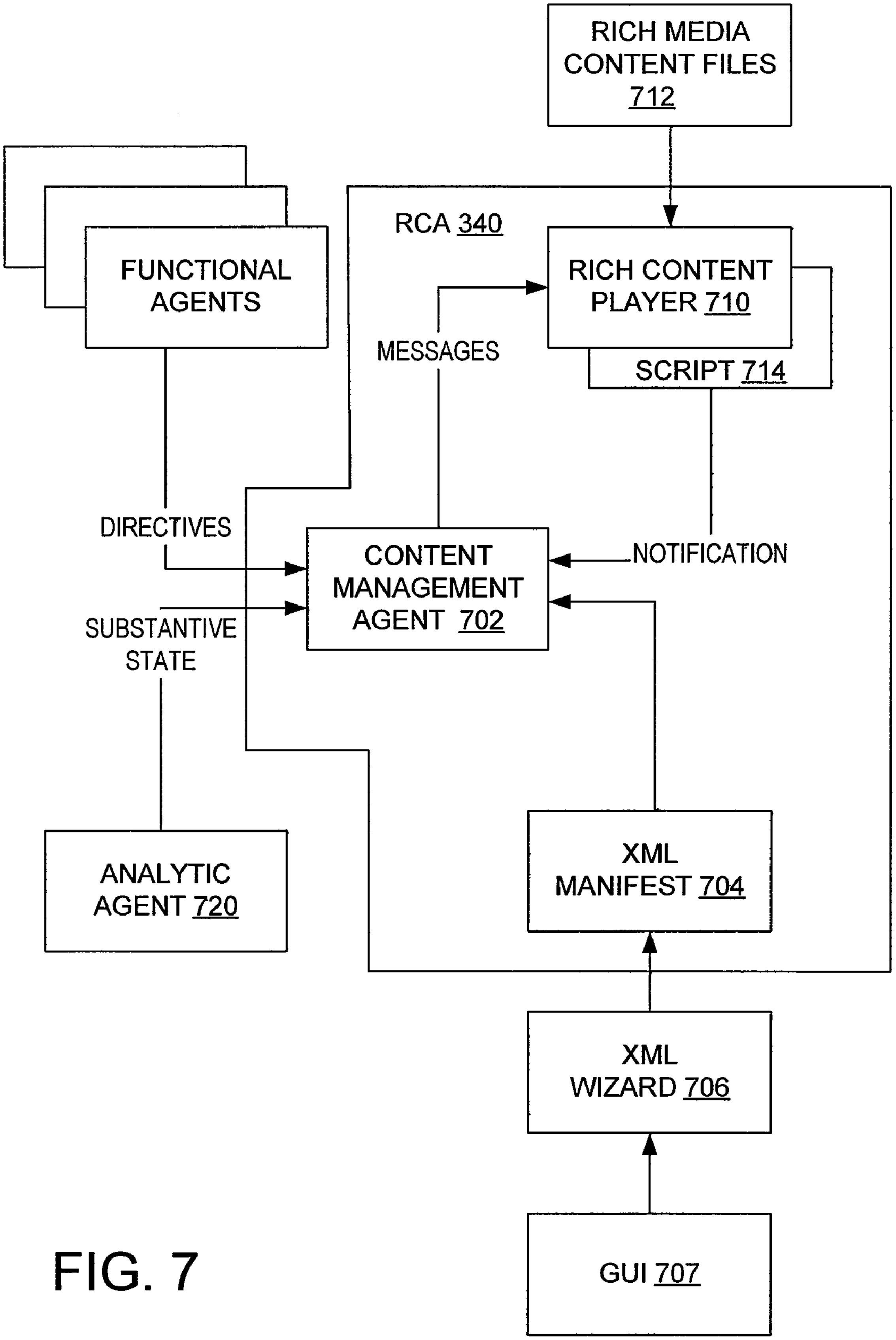
FIG. 7 is a block diagram of selected elements of an embodiment of a rich content agent.

Referring now to FIG. 7, selected elements of an exemplary implementation of RCA 340 are depicted. In the depicted embodiment, RCA 340 includes a content management agent (CMA) 702, an XML Manifest 704, and a media player 710. Functional agents are shown as providing directives to CMA 702 while an analytic agent 720 provides the substantive state to CMA 702. In this implementation, the functional agents may include, for example, the cashless agent 330 and the directives may include the procedural state information described above. In this manner, FIG. 7 depicts CMA 702 receiving information including substantive and procedural status information from a field asset 102.

RCA 340 as shown in FIG. 7 includes an XML Manifest 704 that is accessible to CMA 702. XML Manifest 702 provides a set of content management rules that are used by CMA 702 in controlling and presenting media to a consumer. In the preferred embodiment, XML Manifest 704 is written in compliance with a predetermined structure or format. More specifically, the elements, keys, and attributes of XML Manifest 704 are specified and used by the functional agents and analytical agent 720. As an example, XML Manifest 704 preferably reflects the procedural stages that a field asset may transition through while servicing a transaction. Each procedural stage may be identified by a specified text tag. The functional agents such as cashless agents 330 may be written in conformance with the specified text tags and procedural states so that functional agents indicate the current procedural state to CMA 702 using nomenclature that is reflected in the XML Manifest 704 so that CMA 702 can easily determine the appropriate content management action to take. When, for example, a cashless transaction is in an "idle" stage, cashless agent 330 or another functional agent may send a directive in the form of a two character string such as "ID" to CMA 702. CMA 702 may then consult XML manifest 704 to determine the content management action to take. A listing of a portion of an exemplary XML Manifest is provided in an Appendix "A" located at the end of this disclosure.

Thus, XML Manifest provides a mapping between procedural or operational directives and rules for managing the media. In the exemplary XML file listed in Appendix "A" for example, the XML file maps the procedural directive "ID" to a media rule that informs CMA 702 which movie clip to play and which text messages, if any, to overlay on the movie clip. CMA 702 retrieves the "rule" indicated in XML Manifest 704 and uses the rule to send a message to rich content player 710. Rich content player 710 in turn responds to receipt of a message from CMA 702 by retrieving and executing, i.e., playing, the movie clip or other rich media content file stored in rich media content files 712.

In this manner, XML Manifest 704 specifies the manner in which CMA 702 responds to directives and other information to control the messages it sends to rich content player 710 and thereby controls the content that is played. FIG. 7 depicts an XML wizard 706 and a graphical user interface (GUI) 707 that facilitate the creation of XML Manifest 704. A developer having adequate knowledge of the rich media content or files that are available and having further knowledge regarding the manner in which rich content is to be provided to consumers, may use invoke XML Wizard 706 via GUI 707. In one embodiment, XML Wizard presents the developer with a series of questions and receives the responses. Some or all of the responses such as file names, for example, may be verified by XML Wizard 706. When XML Wizard has acquired sufficient information via the consumer responses, it generates XML Manifest 704 automatically thereby saving the developer from having to learn the nuances of the XML structure being used and ensures that the manifest has proper formatting.

Media player 710 may include elements of commercially distributed rich content players including, as examples, Adobe's Flash® player, Apple's Quicktime® player, and the like. RCA 340 as depicted in FIG. 7 illustrates a script file 714 in conjunction with rich content player 710. Some commercially pervasive rich content players such as the Adobe Flash® player employ a script file to enhance the interactivity of the player application and to extend its features to include for example presentation of text and functional buttons overlying a rich content image or movie. In one aspect, RCA 340 may facilitates consumer interactivity by enabling the solicitation of a responses from the consumer and providing features such as soft keys for receiving response from the consumer. FIG. 5, for example, illustrates script file 714 sending a "notification" to CMA 702. The illustrated notification may represent consumer input that is captured via the rich content display in conjunction with the rich content player application.

Although the present disclosure and its advantages have been described in detail, it should be understood that various changes, substitutions and alternations can be made herein without departing from the spirit and scope of the disclosure as defined by the following claims.

APPENDIX "A"

```
<ContentManifest>
<!--Copyright (C) 2006 Isochron Inc. All Rights Reserved-->
<!--Do Not Edit The Meta Element. Internal Use Only-->
<Meta version="1.0" creation="Month-Year" ></Meta>
    <MovieLoop restart="true">
```

<!--The Movie Loop defines Rich Content Movies (e.g., SWF) that will play in succession. The loop will run continuously until interrupted with a consumer event, i.e. a card swipe. Movies will run to completion and then move onto the next movie unless that movie's rule prevents it from running. If a consumer event prompt an interrupt, the loop will start at the beginning based on the "restart" rule. If "restart" is true, then the movie loop will start at the beginning each time the loop replays following a consumer event. If "restart is false, then the movie loop will continue playing where it left off. Movies to be played in the movie loop are defined within the MovieLoop tag. Key "loopnode" defines the attributes of a movie to play, starting with the movie's filename. Also note that the Rich Content file extension is not included and no file paths are provided as the content manager will use discrete path for the movies (within the /movies directory). A specific movie can be listed within the loop more then one time and in any order Within a movie node, there are additional attributes to the movie title (filename). These attributes are not required to play a movie and are only used if advanced content management features are desired.

"startdate" earliest date a movie will start to play (start at midnight). If no start date is provided, it will play immediately.

"enddate" last date a movie will play (to midnight).

```
    -->
        <loopnode movie="movie_1" startdate="09-01-2006" enddate=
"09-29-2006"></loopnode>
        <loopnode movie="movie_2"></loopnode>
        <loopnode movie="movie_3"></loopnode>
    </MovieLoop>
```

<!--The Skin element allows a skin movie to be shown on the display. Skins can be enabled/disabled on the fly as each specific stage is shown, but this element drives the skin setting at startup and during the movie loop. It is the "master setting" for the content. Skins have three attributes:

"setting" this is the setting at content start. "on"/"off" are the two allowed settings. The system defaults to on.

"textfield1" skins have maximum of two optional text variable fields. These fields are set as attributes. "textfield1" is the first text field "textfield2" this is the second optional text field If textfields attributes are not to be used, they need not be included as an element attribute or can be set as " ", which would place them as blank text.

-->

<TopSkin setting="on" textfield1="Cash Only" textfield2="Thank You"> </Topskin>

<!--Fade Speed Element is used to drive transitions between movies and stages. From movie to movie the transition is driven through a Rich Content fade. Fade speeds (framerate) can be set using two element attributes. Note that setting these two values is not required, as they do have default settings.

"stageFadeSpeed" sets the fade speed between stage transitions. Default: 10

"movieFadeSpeed sets the fade speed between stage transitions. Default: 5

The higher the value, the higher the speed, and thus the higher the frame rate. These values must be a divisor of 100.

Example: a setting of 5=20 frames per transition (5×20=100).

```
-->
<FadeSpeed stageFadeSpeed="10" movieadeSpeed="10"></FadeSpeed>
<Rules>
    <Cashless>
        <Promotions loopall="yes">
```

<!--Promotions define lists of promotions, in the form of movie overlays, that are presented during the consumer's "make selection" stage. This can be in the form of featured products, which are different movies (promotions) that are shown to the consumer while the "make selection" stage (MS, see below) is being presented. While the MS stage has its own corresponding movie that plays during the stage, the featured products movie is a semi-transparent overlay to the stage movie. An example of this might be to present a specific featured brand for the month, or a new product rollout. As the content manager is tied into the entire device system, rule can be applied. For example if a product is out-of-stock, why bother featuring it to the consumer.

The "loopall" attribute directs the content manager to loop through all featured products in the list (with each consumer selection), provided their ruleset is valid.

Each promotion is defined with an attribute called "promo"

| Attribute | Description |
|---|---|
| order | the order in which a promo is played or the ruleset applied. No two orders should be the same, and they should increment (1, 2, 3, . . . ) |
| movie | name of the movie for the stage. Do not include extension, swf assumed |
| productsku | DEX-programmed SKU for the product. Enables DEX monitoring for out-of-stock (optional if not tied to DEX) |
| description | Friendly description for the featured product (or promo) |
| displayifOOS | Present the movie even if the SKU is out-of-stock in the vendor (per DEX). (optional) |
| startdate | earliest date a movie will start to play (start at midnight). If no start date is provided, it will play immediatly. (optional) |
| enddate | last date a movie will play (to midnight). If no end date is provided (optional) |

Note that promo can be shown without it being mapped to a specific product. For example, you might want a promo that presents Mycoke.Com information (see example below). In this case, the product-based attributes do not apply.

```
    -->
        <promo order="1" movie="promo_BottledWater" productsku="1001"
description="20oz Bottled Water" displayifOOS="no" ></promo>
        <promo order="2" movie="promo_Soda" productsku="1000" description="12oz
Can Soda" displayifOOS="no" startdate="09-01-2006" enddate="09-29-2006" ></promo>
        <promo order="3" movie="promo_BottledWater2" description="MyWater Logo"
></promo>
        </Promotions>
        <StageDirectives>
```

<!--Stage Directives are used to map cashless stages to a movies. Cashless stages are mapped to movies via directives, which are used by the internal systems to direct the content manager to move to a next stage (and what the stage might be).

Note: Directives themselves are for internal use, and should not be edited.

| Attribute | Description |
|---|---|
| name | descriptive name for the stage |
| directive | mapping directive for the stage. Do Not Edit |
| movie | name of the movie for the stage. Do not include extension, swf assumed |
| skin | turn on/off the skin (optional) |

-continued

| Attribute | Description |
|---|---|
| time | time in the stage. Minimum number of seconds for a stage to play (if 0, then continguous, won't stop until stage change). note that this is minimum time as some stages require more time to process, like remote authorization, for example |
| tf1-tf4 | text field 1 through text field 4, maps to variable text fields in the movie |

If a text field (defined by attribute "tfn, in which n is 1 through 4), is wrapped with an underscore, _underscore_, then it is a variable rather then fixed text. The following text field variables exist:

| variable | Description |
|---|---|
| __cardtype__ | American Express, Visa, Mastercard, Discover |
| __cardholder__ | Consumer's name on the credit card |
| __totalamount__ | amount of the completed transaction set (all vends) |
| __vendamount__ | amount of a single vend |
| __diagnosticsitem__ | Internal Use Only |
| __diagnosticsdata__ | Internal Use Only |
| __movieloop__ | Please the movie loop as the stage, using the skin for text output |
| __purchasestate__ | cash-only or credit, with tf2 and tf3 the credit text or cash only text |

A stage can also support questions, if appropriate. Example: Multivend change, which provides the use a chance to make another purchase without swiping their credit card. In the case of a question, the stage information is the same, except the attributes are well defined:

| Attribute | Description |
|---|---|
| tf1 | Primary Question to ask question |
| tf2 | secondary question/comment (not required) |
| tf3 | button 1 test |
| tf4 | button 2 test |

```
    -->
            <stage name="Startup" directive="SU" movie="stage_normal"
skin="on" time="0" tf1="_diagnosticsitem_" tf2="Isochron, Inc." tf3="Austin, TX"
tf4–"www.isochron.com"></stage>
            <stage name="Idle" directive="ID" movie="_movieloop_" skin="on"
time =0" tf1="_purchasestate_" tf2="Swipe Credit Card to Begin" tf3="Cash Only" tf4="Thank
You"></stage>
            <stage name="Validation Failure" directive="VF"
movie="stage_normal" skin="off" time="1" tf1="Invalid Card" tf2="Please Trey Again" tf3=""
tf4=""></stage>
            <stage name="Read Failure" directive="RF" movie="stage_normal"
skin="off" time="1" tf1="Read Failure" tf2="Please Try Again" tf3="" tf4=""></stage>
            <stage name="Local Authorization" directive="LA"
movie="stage_normal" skin="off" time="1" tf1="Processing Card..." tf2="Please Wait" tf3=""
tf4=""></stage>
            <stage name="Remote Authorization" directive="RA"
movie="stage_normal" skin="off" time="1" tf1="Authorizing..." tf2="Please Wait" tf3=""
tf4=""></stage>
            <stage name ="Authorization Denied" directive="AD"
movie="stage_normal" skin="off" time="1" tf1="Authorization Denied" tf2="" tf3=""
tf4=""></stage>
            <stage name="Selection" directive="MS" movie="stage_normal"
skin="off" time="1" tf1="Make Selection" tf2="" tf3="" tf4=""></stage>
            <stage name="Transaction Canceled" directive="TC"
movie="stage_normal" skin="off" time="1" tf1="Transaction Canceled" tf2="" tf3=""
tf4=""></stage>
            <stage name="Vending" directive="VG" movie="stage_normal"
tf1="Vending..." skin="off" time="1" tf2=""></stage>
            <stage name="Multi Vend" directive="MV" movie="stage_button"
skin="off" time="0" tf1="Make another Purchase?" tf2="" tf3="Yes" tf4="No"></stage>
            <stage name="No sale" directive="NS" movie="stage _normal"
skin="off" time="1" tf1="No Sale" tf2="" tf3="" tf4=""></stage>
            <stage name="Total Sale" directive="TS" movie="stage_normal"
skin="off" time="1" tf1="Total Sale:" tf2="_totalamount_" tf3="" tf4=""></stage>
            <stage name="Thank You" directive="TY" movie="stage_normal"
skin="off" time="1" tf1="Thank You" tf2="_cardholder_" tf3="For Your Purchase" tf4=""></stage>
            <stage name="Diagnostic" directive="DI" movie="stage_normal"
skin="off" time="0" tf1=" diagnosticsitem_" tf2="_diagnosticsdata_ tf3="" tf4=""></stage>
          </StageDirectives>
        </Cashless>
    </Rules>
</ContentManifest>
```

What is claimed is:

1. A vending machine, comprising:

a coin acceptor, a bill validator, and a card reader all operatively connected to a shared multi-drop bus (MDB);

a rich content display device operable to display color graphics;

an MDB-compliant extended function adapter (EFA) operatively coupled to the shared MDB bus, wherein the EFA includes a rich content agent (RCA) operable to manage rich content displayed on the display device, wherein the RCA comprises a structural file providing a mapping between directives indicative of a state of the vending machine and rich content management rules.

2. The vending machine of claim 1, wherein the RCA comprises a content management agent (CMA) operatively coupled to a rich content player operable to execute a rich content file for display on the display device.

3. The vending machine of claim 2, wherein the EFA further includes a cashless agent operable to facilitate cashless transactions initiated via the card reader and further operable to generate information indicative of a procedural state of the vending machine, wherein the procedural state is indicative of a current stage in a cashless transaction sequence.

4. The vending machine of claim 3, wherein the CMA is enabled to detect the procedural state information and control the presentation of rich content on the display device based at least in part on the detected procedural state information.

5. The vending machine of claim 2, wherein the EFA further includes an analytic agent operable to determine a substantive state of the vending machine.

6. The vending machine of claim 5, wherein the substantive state of the vending machine includes an inventory state and an environmental state of the vending machine.

7. The vending machine of claim 1, wherein the RCA is operable to provide targeted messages to consumers and potential consumers, the targeted messages depending at least in part on the location of the vending machine.

8. The vending machine of claim 7, wherein the content of the targeted message is based on a criterion selected from a group of criteria of a product offered for sale by the vending machine, and a transaction history associated with a consumer.

9. The vending machine of claim 1, wherein the RCA is operable to manage the rich content to provide an incentive program to a consumer.

10. The vending machine of claim 9, wherein the incentive program is based on a criterion selected from the group of criteria consisting of date, time, and location of the vending machine.

11. The vending machine of claim 1, wherein the RCA is operable to manage the rich content to provide a loyalty program to a consumer including providing reward points to the consumer with selected transactions.

12. The vending machine of claim 1, wherein the RCA is operable to manage the rich content to provide a sweepstakes or contest to consumers.

13. The vending machine of claim 1, wherein the rich content display device is selected from a cathode ray tube (CRT) display device, a liquid crystal display (LCD) device, and a plasma display panel (PDP) device.

14. A vending machine, comprising:

a coin acceptor, a bill validator, and a card reader all operatively connected to a shared multi-drop bus (MDB);

a rich content display device operable to display color graphics;

an MDB-compliant extended function adapter (EFA) operatively coupled to the shared MDB bus, wherein the EFA includes a rich content agent (RCA) operable to manage rich content displayed on the display device; and a content management agent (CMA) operatively coupled to a rich content player, wherein the CMA is enabled to detect a location of the vending machine and manage the presentation of rich content on the display device based at least in part on the location of the vending machine.

15. A vending machine, comprising:

a coin acceptor, a bill validator, and a card reader all operatively connected to a shared bus;

a rich content display device operable to display color graphics;

an extended function adapter (EFA) operatively coupled to the shared MDB bus, wherein the EFA includes a rich content agent (RCA) operable to manage rich content displayed on the display device, wherein the RCA comprises a content management agent (CMA) operatively coupled to a rich content player operable to execute a rich content file for display on the display device, wherein the RCA further includes a structural file providing a mapping between directives provided to the CMA and indicative of a procedural state of the vending machine and rich content management rules.

16. The vending machine of claim 15, wherein the structural file comprises an XML manifest file.

17. The vending machine of claim 16, further comprising an XML wizard application operable to create the XML manifest file based on input provided by a user via a user interface.

18. A remote field asset suitable for use in a machine to machine network environment, the field asset comprising:

a color graphics display device;

a rich content player application having access to rich content files and configured to play at least some of the rich content files on the display device;

a rich content agent coupled to a multi-drop bus (MDB) and operable to manage the rich content player including sending at least one message to the rich content player indicative of a rich content file to display; and a content management agent (CMA) operatively coupled to the rich content player application, the CMA enabled to detect a location of the remote field asset and manage the presentation of rich content on the color graphics display device based at least in part on the location of the remote field asset.

19. The remote field asset of claim 18, wherein the rich content agent comprises a structural file providing a mapping between directives indicative of a state of the vending machine and rich content management rules.

20. A computer program product comprising computer executable instructions, stored on computer readable medium, for implementing rich content displays on a vending machine field asset, the computer program product comprising:

instructions for processing a structural file that provides a mapping between directives indicative of a procedural state of the vending machine and rich content management rules;

instructions for processing a substantive state of the vending machine, wherein the substantive state includes a location of the vending machine;

instructions for generating a management message indicative of a rich content file based at least in part on the processed substantive state and the procedural state; and instructions for managing a rich content display device to display the rich content file.

* * * * *